Feb. 7, 1933.  A. L. MORSE  1,896,912
CABLE CUTTER
Filed Aug. 3, 1931
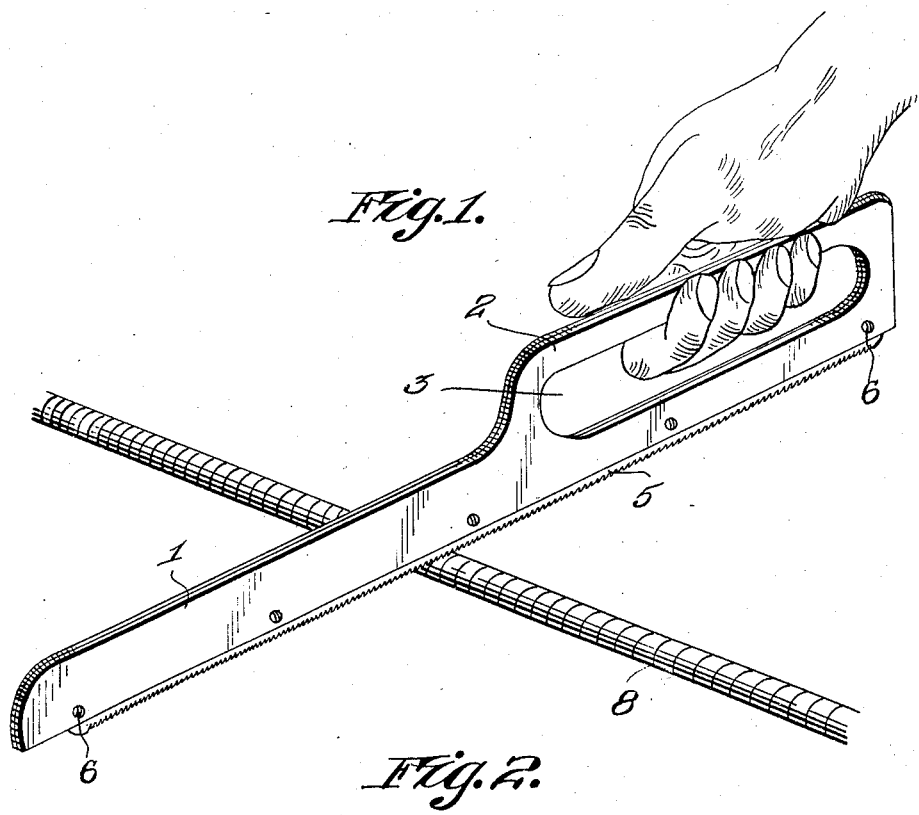
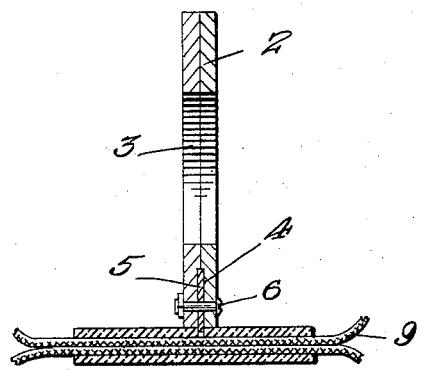
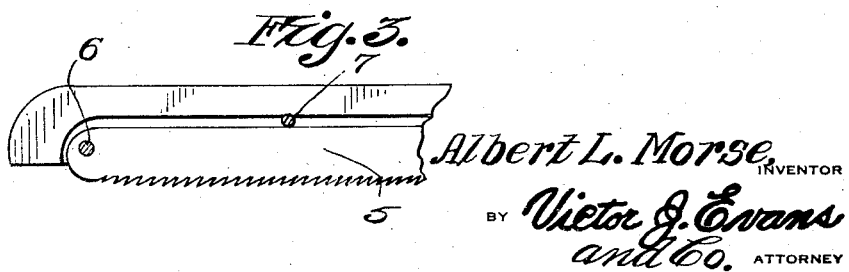
Albert L. Morse, INVENTOR
BY Victor J. Evans and Co. ATTORNEY Patented Feb. 7, 1933

1,896,912

UNITED STATES PATENT OFFICE

ALBERT L. MORSE, OF SANFORD, MAINE

CABLE CUTTER

Application filed August 3, 1931. Serial No. 554,856.

The object of this, my present invention, is the provision of a saw for cutting B. X. and other armored electric cables and for other uses by electricians, and the primary object of the invention is the provision of a saw for this purpose which will smoothly cut through the material in an easy and expeditious manner without necessitating the bending or breaking of the armor and without liability of the blade of the saw contacting with the conductor or inflicting injury thereto and the sheathing therefor.

To the attainment of the foregoing the invention consists in the improvement hereinafter described and definitely claimed.

In the drawing:

Figure 1 is a perspective view of the improvement in operation.

Figure 2 is a transverse sectional view therethrough.

Figure 3 is a detail longitudinal sectional view through the forward end of the improvement.

In the construction disclosed by the drawing the body of the saw is made up of two similar pieces to include a reduced body portion 1 and a widened handle portion 2. The handle portion is provided with a longitudinal slot 3 to aid the operator in gripping the handle and likewise preventing the fingers of the operator from coming in contact with the lower or straight edge of the improvement.

The body as well as the handle portion of the saw from the outer straight edge thereof is channeled longitudinally to provide the same with a pocket 4 for a saw blade 5. The blade is of the type usually employed by hack saws and the pocket is shaped to snugly receive the blade 5 therein. The blade 5 is provided at its ends with the usual round openings and in the present instance I pass through these openings and through the body of the saw bolts 6 which are preferably engaged by nuts. Other bolts 7 also engaged by nuts are passed through the body of the saw and are positioned to contact with the inner or non-sharpened edge of the blade 5. The pocket is of a greater depth than the width of the saw blade, and the bolts 7 may be removed when blades of a size to be snugly received in the pocket 4 are employed. The toothed edge of the blade projects a determined distance beyond the straight edge of the saw, the distance being sufficient to permit of the blade cutting through a B. X. or like armored cable 8 without contacting with the wrapped conductors 9 therein. By reference to Figure 1 of the drawing it will be noted that the handle of the device is arranged directly opposite the rear of the cutting blade 5 and that the slot 3 of the said handle is of a length approximately or more than one-third of the length of the blade. Thus when the blade has its rear portion arranged in cutting position the operator gripping the handle will exert a direct force upon the said rear portion of the blade which materially facilitates the cutting operation.

The improved saw cannot inflict injury inside of any armored conductor and with the improvement one hand of the operator of the saw is free. The blades 5 will last almost indefinitely as the same being pocketed in the saw are rendered proof against breakage. The cutting operation will have no tendency to open the convolutions of the B. X. armor and it leaves the ends of the armor smooth and even. The device may be used to cut wires inside of the B. X. armor by separating the ends of the armor slightly and it can also be used in any place that can be reached by the hands of the operator. The device is light and small so that the same can be carried in the pocket of the user and likewise the device may be easily and cheaply constructed and also cheaply marketed.

Having described the invention, I claim:

A saw for electricians' use, comprising two similar flat pieces to include a body having a longitudinally disposed widened end which is slotted longitudinally to provide a handle and having one of its edges straight throughout the length thereof, the confronting faces of the pieces, from the straight edge thereof, being grooved longitudinally to provide a pocket for a saw blade whose ends are provided with openings, bolt members passing through the saw and through the openings in the blade and other bolt members also passing through the saw for contacting with the inner and non-toothed edge of the blade and for holding the two-piece body connected, and the handle being disposed directly opposite and in a plane with the saw and being of a length equalling or exceeding one-third of the length of the saw.

In testimony whereof I affix my signature.

ALBERT L. MORSE.